United States Patent [19]

Hanson et al.

[11] 4,348,032
[45] Sep. 7, 1982

[54] HEAD GASKET HAVING RESILIENT SEAL WITH BELLEVILLE SPRINGS

[75] Inventors: Larry K. Hanson, Los Alamitos; Silvano A. Bosdachin, Downey, both of Calif.

[73] Assignee: The Fluorocarbon Company, Los Alamitos, Calif.

[21] Appl. No.: 245,395

[22] Filed: Mar. 19, 1981

[51] Int. Cl.³ .............................................. F16J 15/06
[52] U.S. Cl. ........................ 277/235 B; 277/206 R; 277/164
[58] Field of Search ............................ 277/97–100, 277/164, 142, 165, 188 R, 205, 206 R, 206 A, 235 R, 235 A, 235 B

[56] References Cited

U.S. PATENT DOCUMENTS

| | | | |
|---|---|---|---|
| 1,339,636 | 5/1920 | Tulloch | 277/206 X |
| 1,802,177 | 4/1931 | Knight | 277/206 |
| 2,210,453 | 8/1940 | Ginn | 277/235 B X |
| 2,366,161 | 1/1945 | Tweedale | 277/206 |
| 2,681,241 | 6/1954 | Aukers | 277/235 B X |
| 2,783,106 | 2/1957 | Barnhart | 277/206 X |
| 3,294,409 | 12/1966 | Burtis | 277/205 X |
| 3,473,813 | 10/1969 | Meyers et al. | 277/235 B X |
| 3,519,278 | 7/1970 | Fuhrmann et al. | 277/206 X |
| 3,866,925 | 2/1975 | Maimstrom et al. | 277/164 X |
| 4,114,906 | 9/1978 | Jelinek | 277/235 B X |

FOREIGN PATENT DOCUMENTS

| | | | |
|---|---|---|---|
| 1207738 | 12/1965 | Fed. Rep. of Germany | 277/205 |
| 1948681 | 4/1971 | Fed. Rep. of Germany | 277/235 B |
| 232193 | 8/1944 | Switzerland | 277/206 |
| 270413 | 5/1970 | U.S.S.R. | 277/205 |

*Primary Examiner*—Robert S. Ward, Jr.
*Attorney, Agent, or Firm*—Knobbe, Martens, Olson, Hubbard & Bear

[57] ABSTRACT

A pair of closed loop spring elements such as Belleville washers stacked in opposing relation within a resilient U-shaped jacket so that the jacket legs are spread by the spring elements to form sealing surfaces when compressed between two members such as an engine head and block.

12 Claims, 6 Drawing Figures

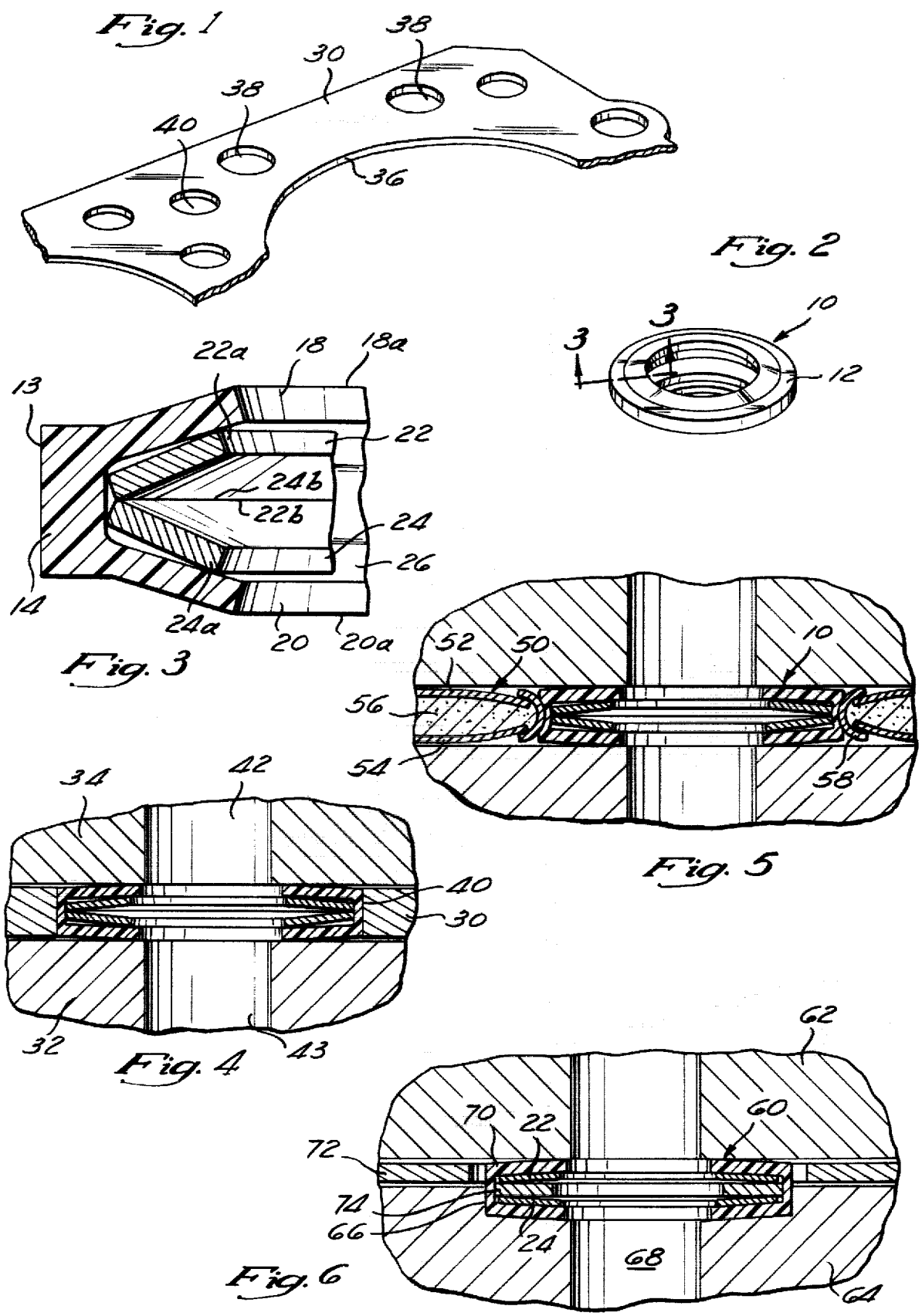

4,348,032

HEAD GASKET HAVING RESILIENT SEAL WITH BELLEVILLE SPRINGS

FIELD OF THE INVENTION

This invention relates to an improved seal that is particularly useful in connection with sealing coolant passages in an internal combustion engine.

BACKGROUND OF THE INVENTION

Diesel engines typically have a series of coolant passages surrounding a cylinder that extends parallel to the cylinder through the engine block and head. A gasket or plate is usually employed between the head and the block to prevent the escape of combustion gasses. Special provision such as a raised rib surrounding a cylinder is sometimes provided to assure that an adequate seal is formed with respect to the combustion products. However, typically a simple fiber ring seal is provided for preventing the leakage of coolant from the coolant passages. Such seal is usually positioned within a hole formed in the gasket or plate so that the interior of the fiber seal is approximately aligned with the coolant port. The fiber seals have been reasonably effective, but there have been leakage problems and there is always a need to improve the reliability of such.

SUMMARY OF THE INVENTION

In accordance with the invention, there is provided a composite seal employing a pair of elements, such as Belleville spring washers, confined within a flexible resilient gasket having a U-shaped cross-section. The elements are placed in face-to-face opposing relation causing the jacket legs to be spread outwardly to form sealing surfaces when the seal is compressed between a pair of members. The washers fit snugly within the jacket so that they are kept in engaging alignment when a load is placed on the outer leg faces of the jacket. With the jacket having a ring shape with legs opening radially inwardly, the seal is particularly useful positioned in a hole in an engine gasket plate and aligned with a passage through the engine head and block, and with the jacket legs compressed between the engine head and block. Preferably, the gasket hole in which the seal is placed will snugly surround the outer periphery of the jacket to help maintain the spring elements in proper face-to-face alignment.

Such a seal is simple to manufacture and is very reliable so as to maintain proper sealing over an extended period of time.

SUMMARY OF THE DRAWINGS

FIG. 1 is a perspective view of a portion of an engine head plate showing the cooling ports therethrough;

FIG. 2 is a perspective view of a seal constructed in accordance with the invention;

FIG. 3 is a cross-sectional view of the seal along the lines 3—3 of FIG. 2;

FIG. 4 is a cross-sectional view of the seal of FIG. 3 when positioned within a hole of the gasket 30 shown in FIG. 1 and sandwiched between an engine block and head;

FIG. 5 is a cross-sectional view similar to that of FIG. 4 but showing the seal positioned within a hole of a gasket which is an alternative to the gasket or plate of FIG. 1; and FIG. 6 is a cross-sectional view similar to FIGS. 4 and 5 of a slightly modified form of the seal in combination with a slightly different engine construction.

DETAILED DESCRIPTION OF THE PREFERRED EMBODIMENT OF THE INVENTION

Referring first to FIGS. 2 and 3, the ring-shaped seal 10 of the invention may be seen to have an outer jacket 12 having a U-shaped cross-section with the outer diameter portion of the jacket forming the closed bight portion 14 and the inner diameter portion forming the open end of the U-shape. The legs 18 and 20 on their exterior surfaces 18a and 20a adjacent the inner diameter form sealing faces. A pair of Belleville washers 22 and 24 are positioned within the annular recess 26 formed within the resilient jacket 12.

As is well-known, a Belleville washer or spring is an annular or ring-shaped, frusto-conical element which may be compressed axially but will spring back when the load is removed. More precisely, it might be described as a frustum of a hollow right cone, with the slant angle of the frustum being small with respect to horizontal. When the element is placed on a flat surface, it does not lie flat, but instead only the lower circular edge engages the flat surface. In other words, the inner diameter of the element defines a plane which is parallel to and spaced from a plane defined by the outer diameter of the element. An axial force on the upper surface of the element towards the flat surface will cause the element to move in a direction to flatten. When the force is withdrawn, the springiness of the element will cause it to return to its unstressed position.

As may be seen, the pair of washers in FIG. 3 are stacked in face-to-face opposing relation with the axial edges 22b and 24b adjacent the outer diameters of the washers engaging each other. Consequently, the main body portions of the washers extend axially away from each other so that the washer portions 22a and 22b adjacent the inner diameters are axially spaced. The axially outer faces of the washer portions 22a and 22b bias the jacket legs axially so that the axial outer surfaces 18a and 20a of the jacket adjacent the inner diameter form the sealing surfaces when the seal is compressed between two members. The maximum axial dimension of the two Belleville washer portions 22a and 22b is greater than the distance between the jacket legs when the jacket legs are unstressed. Consequently, the jacket legs are urged axially outwardly as illustrated in FIG. 3; but they can be compressed towards each other due to the resiliency of the jacket material and the springiness of the washers.

It is important that the outer edges 22b and 24b of the Belleville washers remain in contact with each other in order to get the spring effect provided by the washers. Thus, it is necessary that the resilient jacket 12 engage the outer peripheries of the washers to hold them in this relation. Note that the radial thickness of the bight 14 of the jacket is greater than the axial thickness of the legs 18 or 20, which helps maintain this relation.

As mentioned above, the seal 10 is particularly useful in connection with sealing coolant passages within an internal combustion engine. FIG. 1 illustrates a portion of one example of an engine sealing plate 30, which is also shown in FIG. 4, sandwiched between an engine block 32 and head 34. The plate performs a sealing or gasket function for the engine cylinders. A portion of the hole 36 in the gasket is aligned with the cylinder in the engine block. The plate 30 is further provided with a plurality of bolt holes 38 through which bolts extend for clamping the head to the block and compressing the plate between the block and head to prevent the leakage of combustion gasses. The plate or block or head may be provided with a raised rib (not shown) surrounding the cylinder which is deformed when the head is clamped to the block to facilitate the seal surrounding the cylinder. The plate 30 further includes a plurality of coolant holes 40 which are aligned with similar passages 42 and 43 in the head and block as shown in FIG. 4. The diameter of the coolant hole 40 is larger than the diameter of the passage 42 and 43 through the head and the block. The seal 10 is shown positioned in the hole 40 in the plate 30, with the seal being compressed between the plate 34 and head 32. The outer diameter of the seal is equal to or slightly larger than the inner diameter of the plate hole 40. This helps hold the Belleville washers 22 and 24 in position. The inner diameter of the seal 10 is equal to or slightly larger than the coolant passages 42 and 43 through the head and the block so that the seal does not impair flow through the passages.

The axial thickness of the bight 14 of the seal jacket 12 is equal to or slightly less than the thickness of the plate 30. On the other hand, the axial thickness of the jacket and seal adjacent the inner diameter of the seal, in an unstressed condition, as shown in FIG. 3 is greater than the thickness of the plate 30. Consequently, when the engine head 34 is clamped to the block 32, the head and block engage the outer axial surfaces of the seal jacket legs 18 and 20 adjacent the inner diameter and compress them towards each other against the resiliency of the jacket material and the springiness of the Belleville washers 22 and 24, as shown in FIG. 4. This creates an excellent seal that prevents coolant leakage along the surfaces of the plate 30. Note that the interior of the seal is open to the coolant flow so that the coolant pressure helps maintain the seal. The Belleville washers are made of stainless steel or other suitable material which can tolerate the coolant. Similarly, the jacket material selected can tolerate the coolant employed. Also, both materials can adequately handle the engine temperatures encountered.

FIG. 5 illustrates the seal 10 employed in connection with a slightly different form of engine gasket 50. In this case, the gasket includes upper and lower layers 52 and 54 of metal sandwiching an inner layer of compressible gasket material 56, and the coolant port is formed by a metallic ring-like member 58 which is concave on its outer diameter so as to fit over the edges of the metallic portions 52 and 54, while its radially inner surface is convex and cooperates with the outer diameter of the seal.

FIG. 6 illustrates another arrangement, wherein a seal 60 is sandwiched between a cylinder head 62 and block 64. In this case a recess 66 is formed in the block surrounding a coolant passage 68. A gasket 72 is sandwiched between the head and the block with the modified form of seal 60 considerably thicker than the gasket, in that the seal must include sufficient thickness to accommodate the axial depth of the recess 66 as well. The seal 60 is axially thicker than the seal 10 due to the addition of a spacer 74 of the desired thickness positioned between the two washers. The diameter of the recess in which the seal is positioned is of course equal to or slightly smaller than the outer diameter of the seal so that the Belleville washers 22 and 24 are adequately confined within the seal jacket 70. This design illustrates the versatility of the seal in that larger spacers may be employed if desired, or additional stacks of Belleville washers could be utilized.

It should be recognized that the seal could be radially reversed to prevent flow into a passage through the seal. That is, the seal jacket may be formed with the closed end of the U-shaped jacket being the radially inner portion and the open end being the radially outer portion. A pair of spring washers are positioned with the washers engaging each other at the inner diameter portion and spaced from each other at the outer diameter portion, to urge the open jacket legs axially. In this situation, the higher fluid pressure would be on the radially exterior edge of the seal and this pressure would still help urge the jacket legs axially to enhance the seal.

While the usual and most useful form of the seals is a circular ring shape, as shown in the drawings, it should be understood that the seal may have other closed loop shapes so long as there are no sharp corners. For example, a seal may be desired to prevent leakage through a passage having a racetrack shape, a rectangular shape with rounded corners, or other non-circular configurations. Such a seal would still employ closed loop, frustum shaped spring elements that would function similarly to circular Belleville spring washers.

What is claimed is:

1. A seal for use between two stationary members such as an engine cylinder head and block, such seal comprising a resilient jacket having a closed loop shape and a generally U-shaped cross-section with a closed end and a pair of legs forming a closed loop recess, a pair of spring elements having a closed loop configuration positioned within the recess in the jacket in face-to-face opposing relation, first portions of the elements extending towards each other and engaging the closed end of the jacket U-shaped cross-section, second portions of the elements being spaced from each other and located adjacent to the open end of the jacket and reacting against the inner surfaces of the jacket, said elements being imperforate on their first and second portions and being resiliently compressible towards each other when the seal is compressed between the members, the elements biasing the legs to spread, and the outer faces of the jacket legs forming sealing surfaces against such members, the jacket outer periphery being sized to fit snugly within walls of a surrounding hole or recess so that the outer edges of the elements are maintained in aligned relation when the elements are compressed.

2. The seal of claim 1 wherein said elements are spring washers having a frusto-conical shape.

3. The seal of claim 1 wherein the first and second portions of the elements have inner and outer edges defining parallel, axially spaced planes.

4. The seal of claim 1 including a spacer positioned between said elements to increase the thickness of the seal.

5. The seal of claim 1 wherein the inner end of the jacket is open and the outer end is closed, and the spring elements engage each other adjacent the closed end of the jacket.

6. The seal of claim 5 in combination with an engine block, an engine head, and a gasket, said block, head, and gasket each having an aligned coolant passage, the passage through said gasket being larger in diameter than the passages through the head and block, said seal being snugly confined in said gasket passage and compressed between said head and block.

7. The combination of claim 6 wherein the thickness of the closed-end of said jacket is about equal to or less than the thickness of said gasket, and the thickness of said seal adjacent its open inner end is greater than the gasket thickness.

8. The combination of claim 6 including means forming a recess in said block forming the end of the block passage adjacent said gasket, said seal being sized to snugly fit within said recess.

9. The combination of claim 8 including a spacer between the seal spring elements to increase the axial thickness of the seal.

10. A gasket assembly for an engine having a cylinder head and a cylinder block including a coolant passage, and a cylinder bore defining a combustion chamber, said gasket assembly comprising a gasket to be positioned between the block and the head, the gasket having a hole arranged to align with the coolant passage, the hole being larger than the passage, and a seal positioned in said hole, the seal comprising a resilient jacket having a closed loop shape and a generally U-shaped cross-section with the closed end snugly engaging the gasket walls forming said hole and the open end opening toward the center of the hole, a pair of spring elements having a closed loop configuration positioned within the recess between the jacket legs in face-to-face opposing relation, outer edges of the elements engaging each other and engaging the closed end of the surrounding jacket, the inner edges of the elements being spaced from each other and located adjacent to the open end of the jacket and reacting against the inner surfaces of the jacket, said elements being resiliently compressible towards each other when the gasket assembly is compressed between the cylinder block and head, the elements biasing the jacket legs to spread and the outer faces of the jacket legs form sealing surfaces against the cylinder head and block.

11. The assembly of claim 10 wherein said elements are spring washers having a frusto-conical shape.

12. The assembly of claim 10 including means forming a recess in said block forming the end of the block passage adjacent said gasket, the recess being the same size as the gasket hole such that the seal also fits within said recess.

* * * * *